Nov. 20, 1956  J. L. GRATZMULLER  2,770,972
CRANKPIN-PISTON CONNECTING MEANS
Filed Feb. 3, 1954  3 Sheets-Sheet 1

Inventor
Jean Louis Gratzmuller
by Brown r Seward
Attorneys

Nov. 20, 1956  J. L. GRATZMULLER  2,770,972
CRANKPIN-PISTON CONNECTING MEANS
Filed Feb. 3, 1954  3 Sheets-Sheet 2
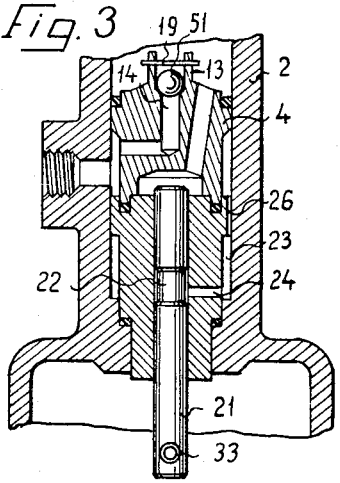
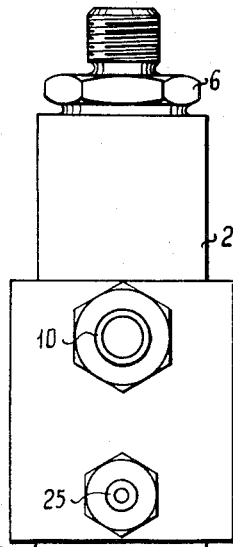
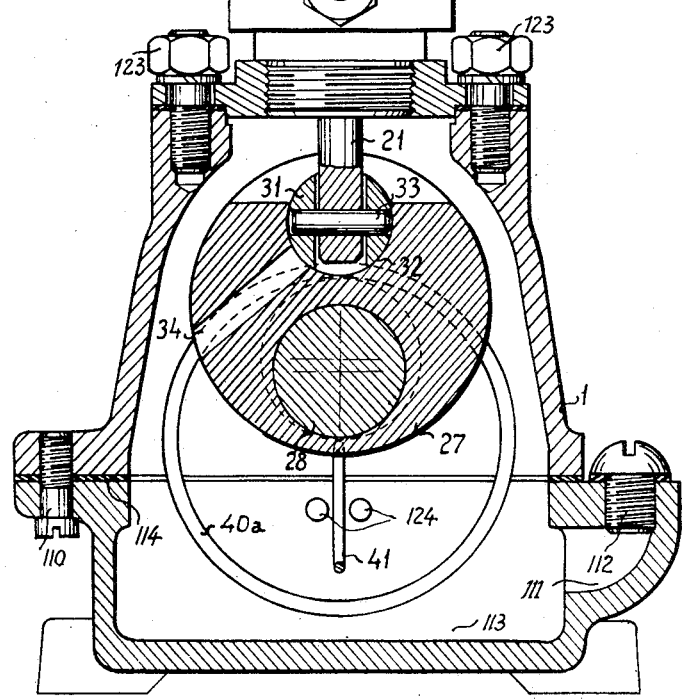
Inventor
Jean Louis Gratzmuller
by Brown + Seward
Attorneys Nov. 20, 1956 J. L. GRATZMULLER 2,770,972
CRANKPIN-PISTON CONNECTING MEANS
Filed Feb. 3, 1954 3 Sheets-Sheet 3

Inventor
Jean Louis Gratzmuller
by Brown & Seward
Attorneys

United States Patent Office 2,770,972
Patented Nov. 20, 1956

2,770,972

CRANKPIN-PISTON CONNECTING MEANS

Jean Louis Gratzmuller, Paris, France

Application February 3, 1954, Serial No. 408,008

Claims priority, application France February 5, 1953

3 Claims. (Cl. 74—49)

The present invention relates to a device to convert linear motion into circular motion, or vice-versa, used in engines, pumps, compressors and machines.

Such a device usually comprises a connecting element and means to articulate the same with the reciprocating and rotating members. In the following description such an assembly will be called a "connecting member."

It is well known that in all machines in which linear motion has to be converted into circular motion, or vice-versa, a very precise machining and adjustment of parts is necessary, due to the fact that, mostly commonly, the reciprocating member is displaceable along an axis right-angled to the axis of rotation of the rotating member.

Evidently, any disalignment of the rotating or the reciprocating member is bound to create frictions and, hence, wear, which, in turn, increases the relative disalignment and, more or less rapidly, causes knocking or even destruction of mechanical parts.

Even with the best possible original alignment, the inevitable wear of machine parts is bound to cause a certain play which, in turn, is bound to bring forth the just mentioned drawbacks.

The present invention has for its purpose to provide a connecting member so designed that an absolute right-angularity between the axes of the reciprocating and the rotating members is rendered unnecessary, which permits obtaining a perfect converting of linear motion into circular motion, or vice-versa, even if the absolute right-angularity is not observed by reason of an original inaccurate machining or of subsequent wear.

An object of the invention is therefore to provide a connecting member so designed as to be connected with the reciprocating member in such a manner as to permit its relative rotation with respect to said reciprocating member around two perpendicular concurrent axes both perpendicular with the axis of said reciprocating member.

Thus, the improved connecting member provides between the rotating member and the reciprocating one, a connection that permits to the rotating member to be disaligned, without this disalignment being transmitted to the reciprocating member and vice versa.

It is to be understood that the connecting member according to the invention avoids the transmission of any undue stresses from the rotating member to the reciprocating member, or vice versa, if one of these members has been improperly machined or has worn down in operation.

From another point of view, the reciprocating member can be properly guided, no disalignment of the rotating member having any effect on said guiding, and vice versa.

This feature permits, in particular, to provide a long piston plunger guided along its whole length in its cylinder, without any danger of creating frictions between said piston and cylinder, under the effect of a possible disalignment of the driving rotating member.

An object of the invention is therefore to provide a hydraulic pump comprising a long plunger piston reciprocating in a long cylinder driven by a crank-shaft through a connecting member according to the invention.

A more particular object is to combine such a connecting member with the hydraulic pump described in the copending applications Ser. Nos. 408,006 and 408,007 of the same inventor filed February 3, 1954, for: "Hydraulic Pumps" and "Hydraulic Pumping Units," respectively.

Through the use of the connecting member according to the invention, rendering the alignment of the rotating member independent from that of the reciprocating member, it becomes possible to provide for a proper alignment of the rotation axis without considering the precise location of the axis of displacement of the reciprocating member nor, more generally, the conditions of displacement of the latter.

Another object of this invention is to journal a rotating shaft having two journals successively machined on a lathe without removing the workpiece, directly in corresponding bearing surfaces also machined in the same manner in the opposite walls of a crank-case and, particularly, of an aluminum crank-case as described and claimed in the copending application Ser. No. 408,009 of the same inventor filed February 3, 1954, for "Crank-shaft and the Corresponding Crank-case" thus obtaining, in a simple and cheap manner, a perfect alignment between the bearing surfaces, without considering the precise position of the axis of displacement of the reciprocating member.

In certain applications, it is advantageous to prevent rotation of the reciprocating member.

Another object of the invention is therefore to provide a connecting member of the type described so designed as to prevent said unwanted or at least unnecessary rotation, which permits, moreover, simplifying the construction.

In fact, in all other applications, it is not objectionable to suppress the freedom of rotation.

A more particular object of the invention is to provide such a connecting member so designed as to be connected to the reciprocating member with two theoretical degrees of freedom.

A specific object of the invention is to provide a connecting member in which said two degrees of freedom are obtained by means of an assembly formed as follows: the end of the reciprocating member is journalled on a pivot right-angled therewith, said pivot being mounted diametrically in a cylindrical member journalled in a bore of the connecting member body, the axis of said bore being right-angled both with the axis of said pivot and that of said reciprocating member and parallel with the axis of a second bore provided in the connecting member to be pivotably mounted on the crank-pin of the shaft.

A more specific object of the invention is to provide a connecting member which is solely constituted by cylindrical parts so freely assembled together and so designed that, once the connecting member is mounted between the rotating member and the reciprocating member, all parts of the assembly thus obtained are interlocked, while the assembling and the dismantling of the parts are rendered particularly easy and rapid.

A still more specific object of the invention is to provide a connecting member of the type described essentially constituted by a one-piece body provided with a cylindrical bore, a pivot-pin freely fitted in said bore, a slot right-angled to the axis of said bore, sufficiently broad to permit the desired play of the reciprocating member and giving access to the mid-portion of said pivot pin when the same is mounted in said bore, a first hole in said pivot pin having its axis right-angled with that of the latter and adapted to receive with a material clearance the end of the reciprocating member, a second hole through said pivot pin, having its axis right-angled both with that of said first hole and with that of said pivot pin, to receive with a free fit an assembling gudgeon-pin, said reciprocating member having its end engageable in said first hole and provided with a hole to be aligned with said second hole to receive said assembling gudgeon-pin, said one-piece body, being furthermore provided with a second bore, substantially parallel to the first one, to be journalled on a crank-pin provided, for this purpose, on the rotating member.

With this arrangement, there are certain parasitic latitudes of relative displacement between the parts, besides the two theoretical degrees of freedom.

However, experiment has shown that said latitudes are not objectionable for the accuracy of the operation of the machine, while they considerably reduce the time of assembling and disassembling as well as the cost of the device.

It is to be noted that the degree of freedom of the end of the reciprocating member around the gudgeon-pin is the one which is provided to accommodate possible relative disalignments between the rotating and reciprocating members, so that no permanent oscillations around said gudgeon-pin are involved, while on the contrary the degree of freedom around the axis of the pivot-pin implies continuous oscillation of the connecting member.

Another object of the invention is thus to use for the above described purposes a gudgeon-pin of small diameter fitted inside a pivot pin of substantial diameter.

Other objects and advantages of the invention will be apparent from the following detailed description together with the accompanying drawings submitted for purposes of illustration only and not intended to define the scope of the invention, reference being had, for this purpose, to the subjoined claims.

In these drawings:

Fig. 2 is a partly elevational, partly cross-sectional view along axis X—X of Fig. 1.

Fig. 3 is a partly axial sectional view showing an alternative embodiment of the pump barrel.

Figures 1, 1A:
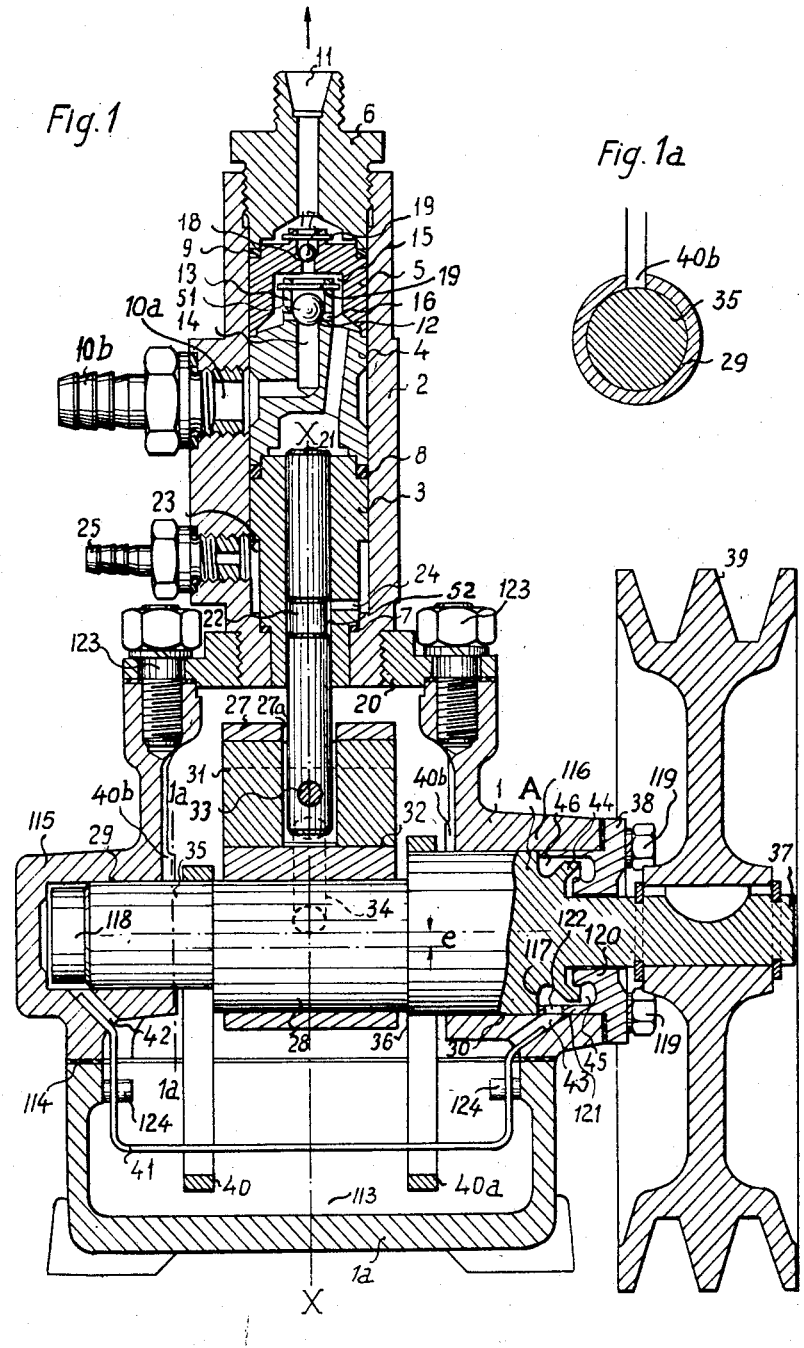
Fig. 1 is a sectional view of a hydraulic pump having its plunger piston driven through a connecting member according to the invention.
Fig. 1a is a detail vertical section taken on the line 1a—1a of Fig. 1.

Referring to the drawings, and more particularly to Figs. 1 and 2, there are shown at 1 the crank-case and at 2 the barrel of the pump screwed in the top wall 20 of said crank-case.

Inside the barrel 2 are stacked: a member 3 constituting the cylinder of the pump, a member 4 in which is formed the intake valve, a member 5 in which is formed a delivery valve and a plug member 6, which, in the example shown, is screwed in the threaded end of barrel 2 and holds in place the whole assembly of the above described members, suitable packing rings such as 7, 8 and 9 being interposed between the relevant members of the stack.

It is to be noted that the packing rings 8 and 9 ensure tightness both between members 3 and 4 and members 5 and 6, respectively, and between said members and the inner wall of barrel 2. Members 3, 4, 5 and 6 are preferably made of a metal having the same coefficient of thermal expansion as barrel 2, so as to avoid any leakage or destruction of the packing rings, as the temperature of the pump varies in operation.

10a is the inlet of the pump to which the liquid is fed through a suitable pipe 10b. 11 is the outlet provided through plug 6. The intake valve essentially comprises a ball 51 cooperating with a seat 12 and guided and centered by a tubular extension 13 of member 4. The liquid is sucked into the pump through inlet 10a, a passage 14 and lateral holes 16 drilled through the wall of the tubular extension 13 in the near vicinity of seat 12.

The delivery valve which is formed in member 5 comprises a ball 17 cooperating with a seat 18. This last valve, of a more conventional type, offers between ball 17 and its cylindrical housing, sufficient annular clearance to permit flowing of the liquid towards outlet 11. Both valves are provided with abutment means to limit the lifting stroke of their respective ball, said abutment means being each constituted by a gudgeon-pin 19.

It is to be noted that the delivery valve is located directly above the intake valve, said valves being both so designed that the air which could be accumulated in the pump cylinder before the pump is started will tend naturally to escape through outlet 11.

A complete separation is provided between barrel 2 and crank-case 1, said separation being ensured by an annular space formed between the plunger piston 21 and cylinder 3, said space freely communicating with the liquid tank, not shown.

In the example shown in Fig. 1, the annular space 52 is formed by a portion 22 of reduced diameter of piston 21, said portion extending over an axial length of the piston 21 at least equal to the stroke of said piston, so as to establish a permanent communication through at least one passage 24 with an annular chamber 23 constantly communicating in turn through a fitting 25 and an individual pipe with a liquid tank (not shown).

The long piston part extending between the pump chamber and the portion 22 of reduced diameter already ensures a good tightness. However, leakages can still occur, particularly when the pump delivers liquid under a very high pressure.

It will be readily understood that these leakages will return to the liquid tank through the free communication offered by the said individual pipe rather than forcing their way between the lower part of the piston and cylinder towards the crank-case 1.

Another important advantage of maintaining the annular space 52 is permanent and free communication with said tank is to ensure in said space a constant liquid pressure slightly superior to the pressure in the crank-case 1. Due to this liquid pressure "seal," air cannot be sucked into the pump chamber during the suction stroke.

Still another advantage of the complete separation between barrel 2 and crank-case 1 is that of permitting the use in the latter of any desired lubricant, whatever the nature of the liquid delivered by the pumping unit.

As shown in Fig. 3, it is possible, in certain cases, to suppress the said independent pipe and to establish a permanent communication between the annular chamber 23 and, hence, the annular space 52 and a spaced upstream the intake valve, the inlet port 14 of which is at the same pressure as the feeding tank, by means of passages 26. This simplified arrangement may be adopted, in particular, when the feeding tank is located in the near vicinity of the pump, so that no objectionable loss of pressure is to be feared.

On the contrary, when such losses of pressure could happen in the main feeding pipe 10b, e. g. in the case when the feeding tank is located at a considerable distance from the pump, it will be preferred to adopt the embodiment described with reference to Figs. 1 and 2 in which the presence of the independent pipe through which no forced circulation of liquid takes place maintains with safety in the annular space 52 the slight above mentioned over-pressure.

Referring again to Figs. 1 and 2, piston 21 is reciprocated by means of an eccentric sheave 28 integral with a crank-shaft A, through a connecting member according to the invention.

Crank-shaft A is journalled into cylindrical bearing surfaces 29 and 30 of different diameters directly bored in two opposed walls of crank-case 1.

Said crank-case is made of a metal having a high coefficiency of thermal expansion and a low modulus of elasticity, such as aluminium. Due to this arrangement, it is possible to journal shaft A directly in the above described bearing portions bored in crank-case 1 without any risk of jamming.

Thus, a certain flexibility of the crank-case walls and the high coefficient of thermal expansion of the metal of said walls ensure a good operation of the pump without providing any special bearings to journal shaft A.

Figure 4:
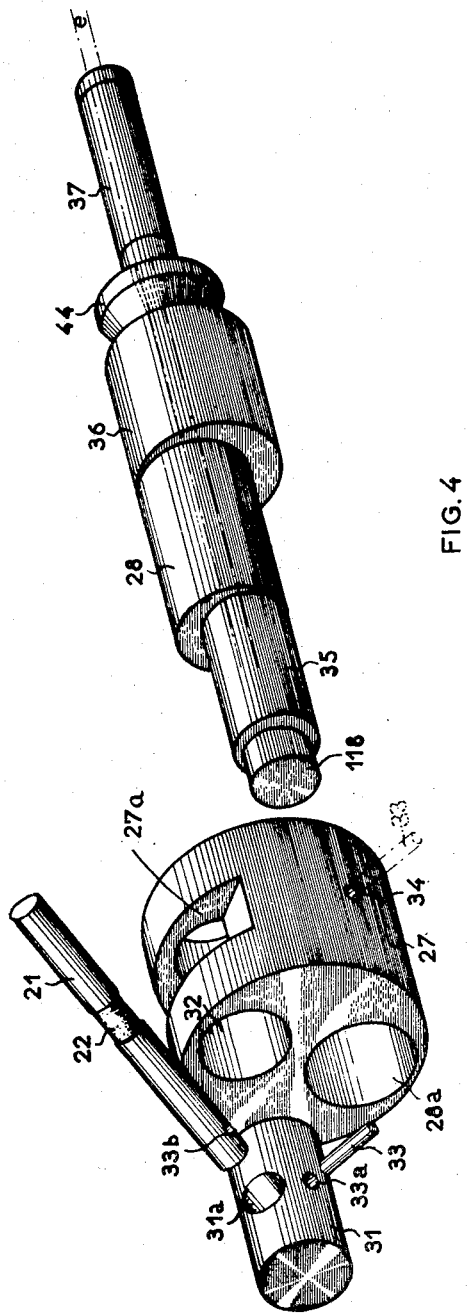
Fig. 4 is an exploded view of the crank-shaft and the connecting member according to the invention.

As more clearly shown in Fig. 4, the connecting member according to the invention is formed as a one-piece body 27, which in the example shown has the shape of a disc.

Two parallel bores 28a and 32 are formed in body 27. The first one 28a has for its purpose to ensure journalling of body 27 around the eccentric sheave 28 of crank-shaft A. In the second bore 32 is freely engaged a pivot pin 31, the axis of which constitutes the usual axis of articulation of the body 27, which acts as a connecting rod, on piston 21.

The piston 21 is itself articulated to said pivot pin 31, said articulation ensuring the second degree of freedom to be provided by the connecting member according to the invention and designed to take care of possible disalignments between piston 21 and crank-shaft A. Pivot-pin 31 is provided for this purpose with a hole 31a into which is engaged the end of piston 21. This end, before being engaged in said hole 31a passes through a slot 27a formed in the mid-plane of the disc 27, the width of said slot being greater than the diameter of the piston 21. The articulation of the piston 21 in the hole 31a of the pivot pin 32 is ensured by a cylindrical gudgeon-pin 33 which is engaged through diametral holes 33a drilled through the pivot pin 31 and a corresponding hole 33b drilled in the end of piston 21. The diameter of the hole 31a is also greater than the diameter of the piston 21, to permit the pivoting of the same.

It will be readily understood that the assembling of parts is practically instantaneous, the operations of assembling consisting simply in introducing a pivot pin 31 in the bore 32, then engaging the end of piston 21 in the hole 31a through the slot 27a and, finally, driving in the holes 33a, 33b and 33a the gudgeon-pin 33.

The shape of the slot 27a and its location are such that, when the pivot pin 31 with the end of piston 21 engaged therein is brought in an angular position in which said piston abuts against one end of said slot, one of the holes 33a is apparent near the other end of said slot, so that the gudgeon-pin 33 can be easily engaged in the three corresponding holes 33a, 33b, 33a. In this position, of the pivot pin 31, these three holes are brought into alignment with a hole 34 drilled in the disc 27 from the periphery of the same and which does not intersect bore 28a, so that it does not interrupt the bearing surface of the latter.

It will be easily understood that in this position of piston 21, the gudgeon-pin 33 can be easily removed through said hole 34 to ensure dismantling of the whole assembly.

Moreover, since in said extreme angular position of piston 21, hole 33a is in the immediate vicinity of the terminal edge of slot 27a, as soon as piston 21 leaves said terminal angular position, the gudgeon-pin 33 will be imprisoned inside body 27. In particular, this is the case when the connecting member according to the invention will be mounted between the eccentric sheave 27 of crank-shaft A and piston 21, when said imprisoned gudgeon-pin 33 will ensure interlocking of all parts of the driving assembly thus obtained.

In the example shown in the drawings (see Fig. 1), as already mentioned above, the bearing surfaces 29 and 30 for shaft A have different diameters, while shaft A proper offers an end 35 of reduced diameter adapted to be journalled in bearing surface 29, the eccentric sheave 28 of greater diameter and, finally, a portion 36 of still greater diameter adapted to be journalled in the bearing surface 30 of the crank-case 1.

Moreover, the circumference defining the cross-section of journal 35 is comprised within that which defines the cross-section of the eccentric sheave 28, while the latter is, in turn, comprised within the circumference which defines the cross-section of journal 36. This arrangement permits mounting the shaft A by introducing the same with its reduced end 35 ahead, first into the bearing surface 30, then through the bore 28a of the disc 27 and, finally, into the bearing surface 29. Once shaft A is mounted as just described, it is secured by means of a plug 38 provided with a hole through which passes the end 37 of shaft A on which a suitable driving member, such as a pulley 39, is keyed.

The lubrication of shaft A is ensured by rings such as 40 freely suspended on shaft A and held in depending position e. g. by a piano wire 41 held in turn by studs 124. Inclined passages 42 and 43 ensure the circulation of the lubricating oil in the bearing portions in which shaft A is journalled.

In order to avoid leakages of lubricating oil at the driven end of the shaft, there is formed on said shaft end a frusto-conical portion 44, while an annular groove with a rounded cross-section 45 is provided in plug 38. The frusto-conical portion 44 of the shaft and said fixed groove 45, in which the edge of portion 44 slightly penetrates ensure a projection of the leaking oil when shaft A is rotated into groove 45 from which said oil flows through the inclined passage 43 into the sump 113.

What is claimed is:

1. A driving connection between a crankshaft and an elongated reciprocatory member of circular cross-section having one end portion provided with a diametrical perforation, comprising a disc-shaped member provided with two axially extending parallel bores one of which is adapted to engage the crank of said shaft, a pivot pin positioned in the other bore and provided with a diametrical hole adapted to receive said perforated end portion of the reciprocatory member with lateral play therebetween, a tangential slot in said disc-shaped member extending transversely to said pivot pin to permit insertion of said perforated end portion through said slot into said hole, said slot having such a length as to permit arcuate oscillation of said disc-shaped member with respect to said reciprocatory member, a second diametrical hole in said pivot pin extending at right angles to the first-mentioned hole thereof, and a gudgeon pin adapted to be thrust through said second hole and through said perforation to connect the reciprocatory member to said disc-shaped member for driving purposes while permitting relative swivel motion of said members for adjusting purposes.

2. A driving connection according to claim 1, in which said crank is constituted by an eccentric cam portion formed on said shaft.

3. A connecting member according to claim 1, in which said slot is so designed as to offer for said reciprocating member two abutments so located that at least in one of the extreme angular positions of said reciprocating member, an end of said gudgeon-pin is accessible, a passage being provided through said disc-shaped member, said passage being aligned with said second hole in said position of said reciprocating member.

References Cited in the file of this patent

UNITED STATES PATENTS

| | | |
|---|---|---|
| 1,360,974 | Pattinson | Nov. 30, 1920 |
| 2,343,211 | Warneke et al. | Feb. 29, 1944 |
| 2,532,591 | Armitage | Dec. 5, 1950 |
| 2,555,809 | Naab | June 5, 1951 |
| 2,587,246 | Touborg | Feb. 26, 1952 |

FOREIGN PATENTS

| | | |
|---|---|---|
| 296,450 | Germany | Feb. 15, 1917 |